United States Patent
Häckel et al.

(10) Patent No.: US 10,851,932 B2
(45) Date of Patent: Dec. 1, 2020

(54) CONNECTION UNIT

(71) Applicant: TI AUTOMOTIVE (FULDABRÜCK) GMBH, Fuldabrück (DE)

(72) Inventors: Andre Häckel, Waldeck (DE); Frank Wachsmuth, Osterode (DE)

(73) Assignee: TI AUTOMOTIVE (FULDABRüCK) GMBH, Fuldabrück (DE)

( * ) Notice: Subject to any disclaimer, the term of this patent is extended or adjusted under 35 U.S.C. 154(b) by 360 days.

(21) Appl. No.: 15/913,282

(22) Filed: Mar. 6, 2018

(65) Prior Publication Data
US 2018/0252345 A1  Sep. 6, 2018

(30) Foreign Application Priority Data

Mar. 6, 2017 (DE) .................... 20 2017 101 274 U
Dec. 22, 2017 (EP) ..................................... 17210440

(51) Int. Cl.
| *F16L 53/38* | (2018.01) |
| --- | --- |
| *F16L 41/02* | (2006.01) |
| *E03B 7/12* | (2006.01) |
| *F16L 25/01* | (2006.01) |
| *F16L 51/00* | (2006.01) |

(Continued)

(52) U.S. Cl.
CPC ................ *F16L 53/38* (2018.01); *E03B 7/12* (2013.01); *F16L 25/01* (2013.01); *F16L 41/021* (2013.01); *F16L 41/023* (2013.01); *F16L 51/00* (2013.01); *F16L 57/02* (2013.01); *F01N 3/208* (2013.01); *F01N 2610/02* (2013.01); *F01N 2610/10* (2013.01); *F01N 2610/14* (2013.01);

(Continued)

(58) Field of Classification Search
CPC . F16L 53/38; F16L 25/01; F16L 41/18; F16L 41/021; F16L 41/023; F16L 51/00; F16L 27/12; E03B 7/12
USPC ............. 285/41, 128.1, 131.1, 133.11, 132.1
See application file for complete search history.

(56) References Cited

U.S. PATENT DOCUMENTS 2,667,899 A * 2/1954 Kingston ................ F16L 51/00
138/27
4,123,092 A * 10/1978 Colbert, Jr. ............. F16L 51/00
285/187

(Continued)

FOREIGN PATENT DOCUMENTS

DE   10 2009 040 012 A1    5/2010
DE   10 2007 016 789 A1   10/2018

OTHER PUBLICATIONS

International Search Report, International Serial No. 20 2017 101 274, dated Mar. 29, 2017, 5 pgs.

*Primary Examiner* — Aaron M Dunwoody
(74) *Attorney, Agent, or Firm* — Dickinson Wright PLLC

(57) ABSTRACT

A connection unit having a connector and at least one fluid line that is connected to the connector, wherein the connector has at least two connection ends and a connector section that connects the connection ends to one another. A fluid line end of a fluid line engages with at least one connection end of the connector. At least one compensation element is connected to the fluid line in the area of the fluid line end of the fluid line, the compensation element being supportable on at least one support stop via at least one spring element. Due to a pressure increase in the connector section, the compensation element is movable against the restoring force of the spring element in the direction of the support stop, with an increase in the internal volume of the connector section.

15 Claims, 3 Drawing Sheets

(51) Int. Cl.
*F16L 57/02* (2006.01)
*F01N 3/20* (2006.01)

(52) U.S. Cl.
CPC .............. *F01N 2610/1446* (2013.01); *F01N 2610/1486* (2013.01); *F16L 2201/20* (2013.01)

(56) References Cited

U.S. PATENT DOCUMENTS

| | | | | |
|---|---|---|---|---|
| 5,101,213 | A * | 3/1992 | Harada | H01Q 1/088 |
| | | | | 343/715 |
| 5,224,739 | A * | 7/1993 | Sauter | F01N 13/082 |
| | | | | 181/228 |
| 7,290,397 | B2 * | 11/2007 | Zurecki | B23Q 1/0018 |
| | | | | 285/39 |
| 2007/0176418 | A1 * | 8/2007 | Frogneborn | F16L 53/38 |
| | | | | 138/103 |
| 2010/0108152 | A1 * | 5/2010 | Caleffi | F16K 31/002 |
| | | | | 137/79 |
| 2010/0253067 | A1 * | 10/2010 | Isenburg | F16L 53/38 |
| | | | | 285/41 |
| 2011/0036081 | A1 * | 2/2011 | Lechner | F16L 21/08 |
| | | | | 60/303 |
| 2014/0361532 | A1 * | 12/2014 | Gauss | F16L 27/12 |
| | | | | 285/145.5 |
| 2015/0369414 | A1 * | 12/2015 | Schwarzkopf | F24H 1/102 |
| | | | | 392/480 |
| 2016/0200038 | A1 * | 7/2016 | Gagne | B29C 45/14467 |
| | | | | 285/119 |

* cited by examiner

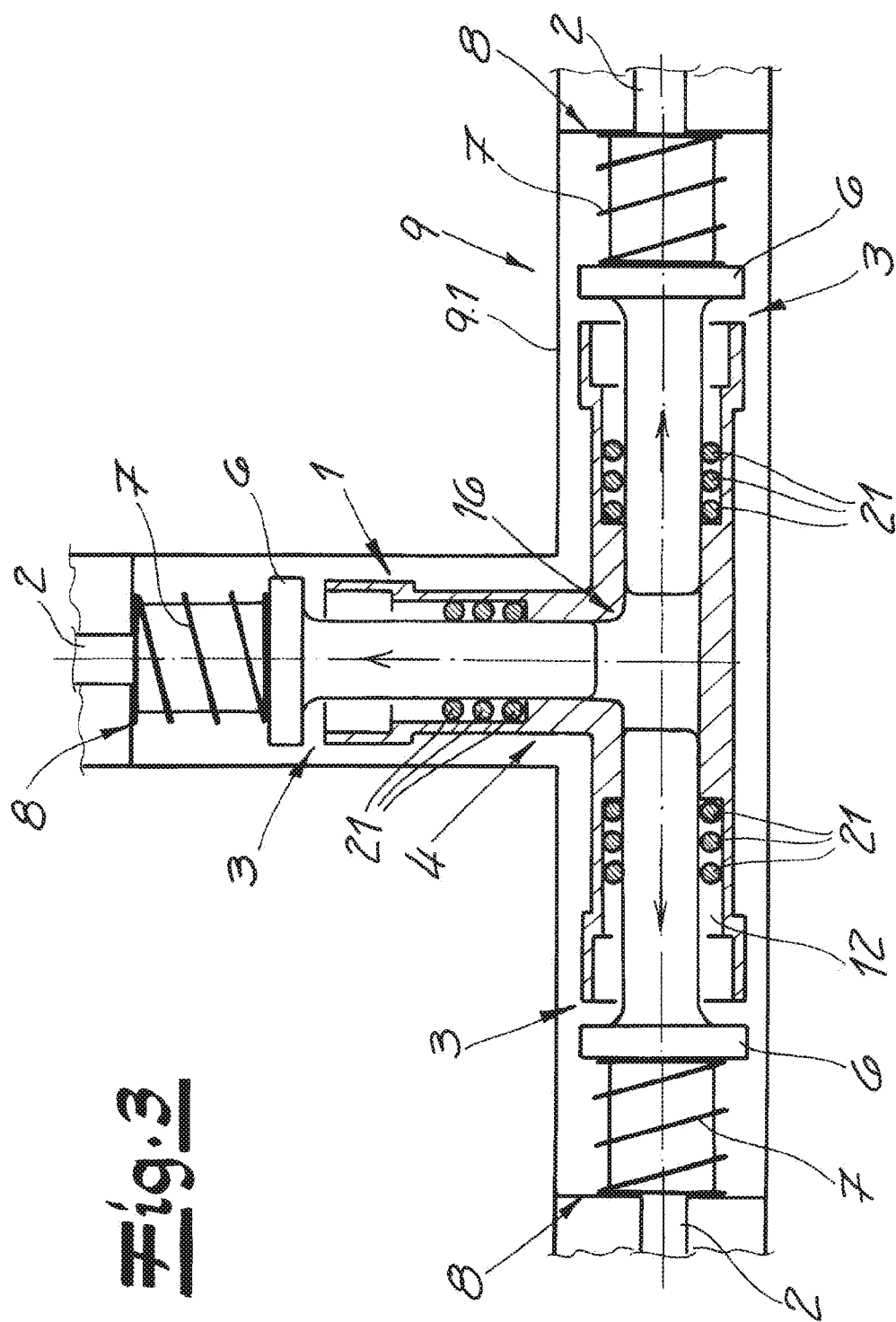

CONNECTION UNIT

RELATED APPLICATIONS

The present patent application claims priority to and the benefit of European Application Serial No. 17210440.8, filed Dec. 22, 2017 and German Utility Model No. DE 20 2017 101 274.3, filed Mar. 6, 2017, which are hereby incorporated by reference in their entirety.

FIELD

The invention relates to a connection unit having a connector and at least one fluid line that is connected to the connector, in particular for conducting a urea solution or an aqueous urea solution, wherein the connector has at least two connection ends and a connector section that connects the connection ends to one another.

BACKGROUND

Connection units of the above-described type are known in practice in various embodiments. In connectors and fluid lines for conducting aqueous media, the problem arises that at low temperatures the aqueous medium freezes with an expansion in volume. As a result of this volume expansion or the accompanying pressure, the connectors and/or fluid lines may be damaged or even completely destroyed. This applies in particular for connectors and fluid lines that are used for conducting aqueous urea solutions. Such aqueous urea solutions, as is known, are used within the scope of so-called SCR (selective catalytic reduction) processes in motor vehicles in order to reduce the nitrogen content in exhaust gas. The above-described problem occurs in particular with such aqueous urea solutions. The aqueous urea solution freezes at low temperatures with an expansion in volume, and due to the corresponding pressure increase, the connectors and fluid lines of the SCR system may be damaged or completely destroyed. In principle, it is known to heat such connectors and/or the connected fluid lines.

SUMMARY

The present disclosure provides a connection unit of the type provided at the outset, in which the problems and disadvantages described above may be effectively avoided.

To achieve this technical object, the present disclosure teaches a connection unit having a connector and at least one fluid line that is connected to the connector, in particular for conducting an aqueous urea solution, wherein the connector has at least two connection ends and a connector section that connects the connection ends to one another, wherein at least one fluid line end of a fluid line engages with a connection end of the connector, wherein in the area of the fluid line end of the fluid line at least one compensation element is connected to the fluid line or to the fluid line end, the compensation element being supportable on at least one support stop via at least one spring element According to further aspects, due to a pressure increase in the connector section, in particular due to the formation of ice pressure in the connector section, the compensation element is movable against the restoring force of the spring element in the direction of the support stop, with an increase in the internal volume of the connector section. Within the scope of the invention, a connection unit having a connector and at least one fluid line that is connected to the connector, the connection unit is used as part of an SCR system in motor vehicles for conducting an aqueous urea solution. In principle, the connection unit according to the invention is suited in particular for motor vehicle applications, and may also be used for other fluid systems in motor vehicles.

According to one embodiment of the invention, the connector according to the invention has at least three connection ends, and preferably exactly three connection ends. The connector section connects the at least three connection ends or the three connection ends to one another. One particularly recommended embodiment of the invention is characterized in that two of the three connection ends of the connector in each case enclose an angle of 120° or approximately 120°. It has proven suitable for the connector to have three such connection ends, and preferably to have a Y-shaped design. In principle, however, the connector may also have a T-shaped design, for example. The connector is advantageously designed as a one-piece plastic part, in particular as an injection-molded part.

In one form, a fluid line end of a fluid line that is connected to the connector according to the invention engages with the connection end of the connector and also with the connector section of the connector. A fluid line end of a fluid line at each connection end of the connector preferably engages with the connection end and also with the connector section of the connector. In the preferred embodiment with three connection ends of the connector and with the recommended Y-shaped design of the connector, each of the fluid line ends of three fluid lines that are connected to the connection ends protrudes into the connection end and into the connector section of the connector, so that the fluid lines project outwardly from a middle section of the connector section in a star-shaped pattern, in a manner of speaking. The three fluid lines or the three fluid line ends are preferably situated concentrically with respect to a midpoint of the connector or of the connector section.

Another embodiment of the connection unit according to the invention is characterized in that a fluid line end of a fluid line engages with the associated connection end at at least two connection ends, preferably at each connection end, of the connector, and that at least one compensation element, preferably one compensation element, is connected to the fluid line or to the fluid line end in the area of each fluid line end. Each compensation element is thus advantageously fixedly connected to the fluid line or to the fluid line end. Within the scope of the invention, each compensation element is supportable or supported on at least one support stop, preferably on one support stop, via at least one spring element in each case, preferably via one spring element in each case. According to one recommended embodiment of the invention, the spring element is a coil spring. In principle, however, other types of spring elements may also be used within the scope of the invention. It has proven suitable for such a spring element, preferably such a coil spring, to be situated between the compensation element and the support stop, and the spring element or the coil spring may rest with one end against the compensation element and with the other end against the support stop. The spring element or the coil spring preferably encloses the fluid line or the fluid line end. Also within the scope of the invention, the support stop is not an integral part of the fluid line or of the fluid line end, and advantageously is not fixedly connected to the fluid line or to the fluid line end.

Yet another embodiment of the invention is characterized in that a connector housing that accommodates the connector. In addition to the connector, at least one fluid line end that engages with a connection end of the connector is advantageously situated in the connector housing, and preferably all fluid line ends that engage with a connection end of the connector are situated in the connector housing. It is recommended that the compensation element that is connected in the area of a fluid line end, together with the spring element associated with the compensation element, is likewise accommodated in the connector housing. According to one preferred embodiment of the invention, a housing connection section which is bordered by the fluid line associated with the connection end of the connector is associated with each connection end of the connector. In one preferred design of the connector with three connection ends, the connector housing advantageously also has three associated housing connection sections. In the Y-shaped design of the connector which has proven suitable, the connector housing advantageously also has a Y-shaped design. In principle, the connector housing may also have a T-shaped or similar design. According to one embodiment variant, the connector housing may be made up of partial shells that are combinable with one another, in particular two half-shells that are combinable with one another.

Furthermore, in one form a fluid line that is connected to the connector has a line sheathing, which may be designed in particular as a corrugated tube. The line sheathing, in particular a corrugated tube, of a fluid line advantageously likewise engages with the associated housing connection section of the connector housing. The line sheathing, in particular the corrugated tube, of the fluid line in question may be fixed to the housing connection section of the connector housing, for example by a form fit with the housing connection section.

One recommended embodiment of the connection unit according to the invention is characterized in that a support stop for a compensation element is situated in the connector housing, and according to one particularly preferred embodiment of the invention is an integral part of the connector housing. A support stop for a compensation element is advantageously connected to the connector housing in one piece.

In one form, a support stop for a compensation element is designed as a component that is oriented transversely, preferably perpendicularly or essentially perpendicularly, with respect to the longitudinal direction of the associated fluid line or with respect to the longitudinal direction of the associated fluid line end. A support stop for a compensation element is preferably designed as a housing element, in particular a housing wall, of the connector housing, that is situated transversely, preferably perpendicularly or essentially perpendicularly, with respect to the longitudinal direction of the associated fluid line or of the associated fluid line end. A support stop for a compensation element is advantageously situated in a housing connection section of the connector housing, and this support stop is preferably designed as a housing element, in particular a housing wall, of the connector housing, that is situated transversely, advantageously perpendicularly or essentially perpendicularly, with respect to the longitudinal direction of the housing connection section. According to one preferred embodiment, when the connector housing is designed in the form of two half-shells, each half-shell advantageously has a housing wall part, and when the half-shells are combined, two of these housing wall parts complete a housing wall that forms a support stop.

In another form, a compensation element is fixedly connected to the associated fluid line end or to the associated fluid line. The compensation element is advantageously connected to the associated fluid line end or to the associated fluid line in an integrally joined and/or form-fit and/or force-fit manner. According to one recommended embodiment of the invention, a compensation element is welded to the associated fluid line end or to the associated fluid line. Within the scope of the invention, a compensation element protrudes from the outer surface of the associated fluid line end or of the associated fluid line. One particularly recommended embodiment of the invention is characterized in that a compensation element has a compensation flange that is situated transversely, in particular perpendicularly or essentially perpendicularly, with respect to the longitudinal direction of the associated fluid line end or of the associated fluid line, or that the compensation element is made up or is essentially made up of such a compensation flange. This compensation flange is advantageously supportable on the support stop via the at least one spring element, preferably via the at least one coil spring. The compensation flange advantageously has a rotationally symmetrical design with respect to the associated fluid line or the associated fluid line end. Within the scope of the invention, the compensation element, preferably the compensation flange, is situated outside the connector and inside the connector housing. The compensation element or the compensation flange is advantageously situated directly or at a small distance in front of the end of a connector section of the connector. Within the scope of the invention, the compensation element or the compensation flange may be supported on the end face of a connector section of the connector.

In the event of a pressure increase in the connector or in the middle section of the connector, and in particular in the event of ice pressure in the connector or in the middle section of the connector, a fluid line end that protrudes into the connector or up to the middle section of the connector is pressed out, in a manner of speaking, from the connector or from the associated connector section, and as a result, the compensation element that is connected to the particular fluid line end may act on the spring element or on the coil spring, so that the fluid line end or the compensation element connected thereto is moved against the restoring force of the spring element. This results in an increase in the internal volume in the connector or in the particular connector section.

When the pressure in the interior of the connector decreases, the compensation element and the particular fluid line end may correspondingly return to their original position under the action of the restoring force of the spring element.

One preferred embodiment of the invention is characterized in that a fluid line that is connected to the connector is designed as a heatable fluid line. The fluid line may be heated by at least one heating component wrapped around the fluid line, for example at least one heating wire wrapped around the fluid line. The heating component or the heating wire may be helically wound around the fluid line. Furthermore, within the scope of the invention the connector is designed as a heatable connector. In principle, the connector may also be heated by means of a heating element that is wound around the connector or around the connector sections of the connector. According to one particularly preferred embodiment of the invention, a heating element protrudes from a heated fluid line into the interior of the connector or into the interior of a connector section. This heating element may in particular be a coil spring that extends out of the heated fluid line into the interior of the connector or into the interior of a connector section of the connector. The heating element protruding into the fluid line, in particular the coil spring protruding into the fluid line, is heated due to the heating of the fluid line, and the heating element, in particular the coil spring, protruding further into the connector section of the connector, in a manner of speaking, further conducts the heat for heating the connector into the connector section. According to one recommended embodiment, a compensation element encloses a heating element that is provided for heating the connector. This applies in particular for the above-described heating element, which, starting from the heated fluid line, extends into the connector or into the connector section of the connector.

The present disclosure is based on the finding that, with a connection unit according to the invention, in particular temperature-related volume expansions of a fluid medium may be easily and effectively compensated for in a functionally reliable manner due to the compensation element provided according to the invention or due to the compensation elements provided according to the invention. Damage to the components of the connection unit according to the invention may be easily avoided, and in the event of volume expansions or the occurrence of ice pressure, a gentle action, in a manner of speaking, on the individual components takes place. The involved structural components may easily and reversibly return to their starting states when the pressure in question decreases, or when the volume expansions decrease. The connection unit according to the invention is suited in particular for SCR systems in motor vehicles that are operated with aqueous urea solutions. It should also be emphasized that a connection unit according to the invention is relatively less complex and less expensive in its design, and may be implemented at relatively low cost.

BRIEF DESCRIPTION OF THE DRAWINGS

The present disclosure is explained in greater detail below with reference to the drawings, which illustrate a single exemplary embodiment. The schematic illustrations show the following:

FIG. 3 shows a schematic illustration of the operating principle of the connection unit according to the invention.

DETAILED DESCRIPTION

Figure 1:
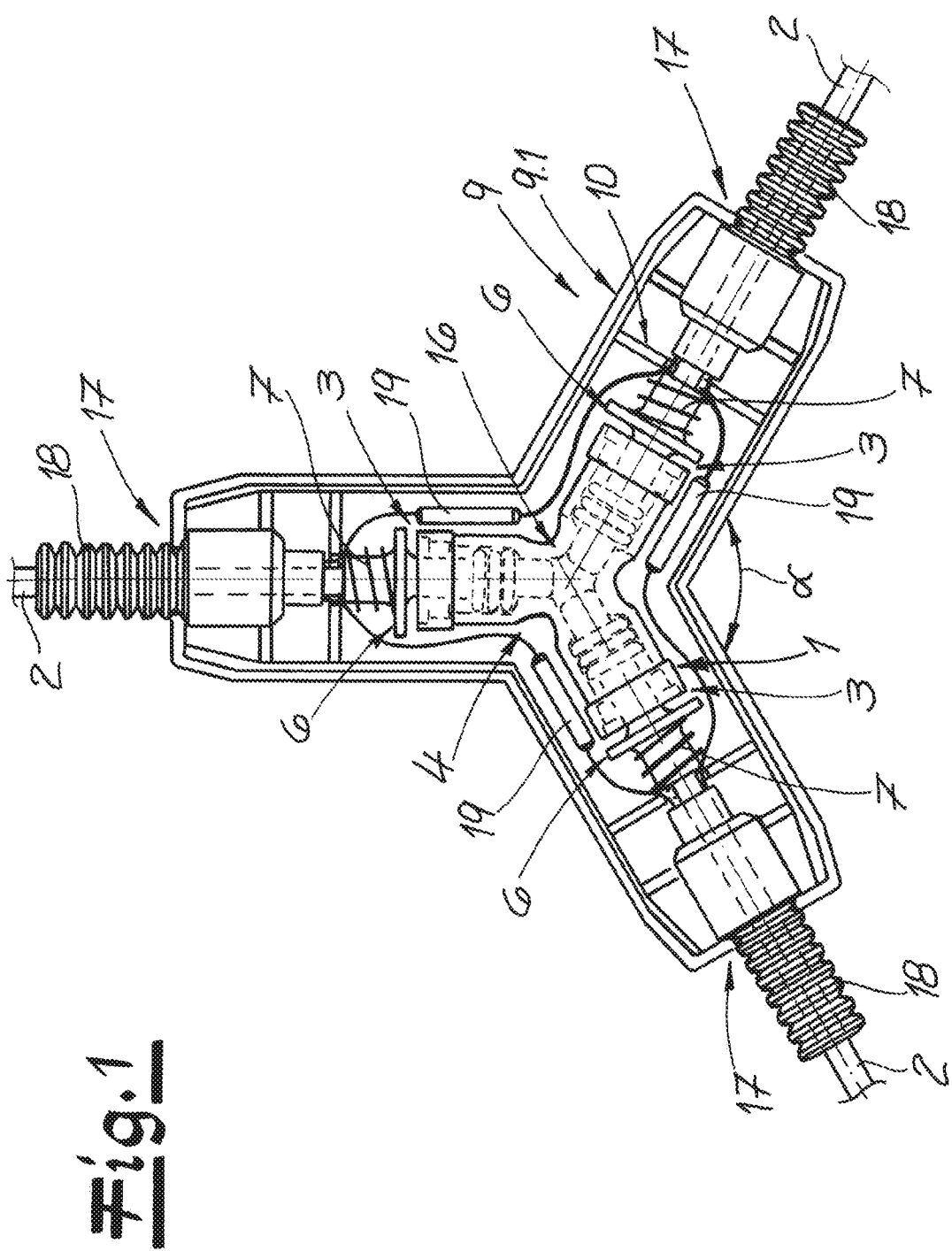
FIG. 1 shows a top view of a connection unit according to the invention in cross section.

The figures show one preferred embodiment of a connection unit according to the present disclosure, having a connector 1 and three fluid lines 2 that are connected to the connector. In the depicted embodiment, the connector 1 and the fluid lines 2 connected thereto may be an integral part of an SCR system of a motor vehicle, and an aqueous urea solution flows through same. In principle, however, the connection unit according to the invention may also be used for other applications, in particular for fluid media in motor vehicles.

In the depicted embodiment, the connector 1 has three connection ends 3 and a connector section 4 that connects the three connection ends 3 to one another. The fluid line ends 5 of the three fluid lines 2 each engage with a connection end 3 of the connector, and in the depicted embodiment protrude up to a middle section 16 of the connector 1. In the depicted embodiment according to FIG. 1, the connector has a Y-shaped design, and two of the three connection ends 3 in each case enclose an angle α of 120°. In the depicted embodiment according to FIG. 1, the design of the connector 1 and of the fluid lines 2 connected thereto is star-shaped, in a manner of speaking. FIG. 3 schematically illustrates the operating principle of the connection unit according to the invention. The connector 1 or the connection unit is shown here with a simplified T shape. In principle, the connector 1 may also have such a T-shaped design.

Preferably, and in the depicted embodiment, a compensation element 6 is connected in each case to the fluid line 2 or to the fluid line end 5 in the area of each fluid line end 5 of the fluid lines 2. Advantageously, and in the depicted embodiment, the compensation elements 6 are designed in the form of compensation flanges that are rotationally symmetrical with respect to the associated fluid line 2 or the associated fluid line end 5. As proven suitable in practice, and in the depicted embodiment, the compensation elements 6 or compensation flanges are in each case situated in front of an end face of a connection end 3 of the connector 1. Advisably, and in the depicted embodiment, the compensation elements 6 or compensation flanges are fixedly connected to the respective fluid line 2, preferably connected to the fluid line 2 in an integrally joined and/or in a force-fit manner, and in particular welded to the fluid line 2 or to the fluid line end 5.

According to the present disclosure, a compensation element 6 is supportable on a support stop 8 via a spring element 7. The spring element 7 is preferably, and in the exemplary embodiment, designed as a coil spring. Due to a pressure increase or volume increase in the connector section 4, in particular due to the formation of ice pressure in the connector section 4, a compensation element 6 is movable against the restoring force of the spring element 7 or the coil spring in the direction of the support stop 8, with an increase in the internal volume 15 of the connector section 4. This is indicated in the figures by a double arrow.

Advantageously, and in the depicted embodiment, a connector housing 9 accommodating the connector 1 is provided. The connector housing 9, the same as the connector 1 in the depicted embodiment according to FIG. 1, has a Y-shaped design, and a housing connection section 17 is advantageously, and in the depicted embodiment, associated with each connection end 3 of the connector 1. As proven suitable in practice, and in the depicted embodiment, the fluid lines 2 each have a line sheathing 18, which preferably and in the depicted embodiment is designed in each case as a corrugated tube. The fluid lines 2 with their line sheathing 18 preferably, and in the depicted embodiment, each engage with a housing connection section 17 of the connector housing 9. The line sheathings 18 or the corrugated tubes of the fluid line are preferably, and in the depicted embodiment, fixed to the ends of the housing connection sections 17 of the connector housing 9 in a form-fit manner.

Figure 2:
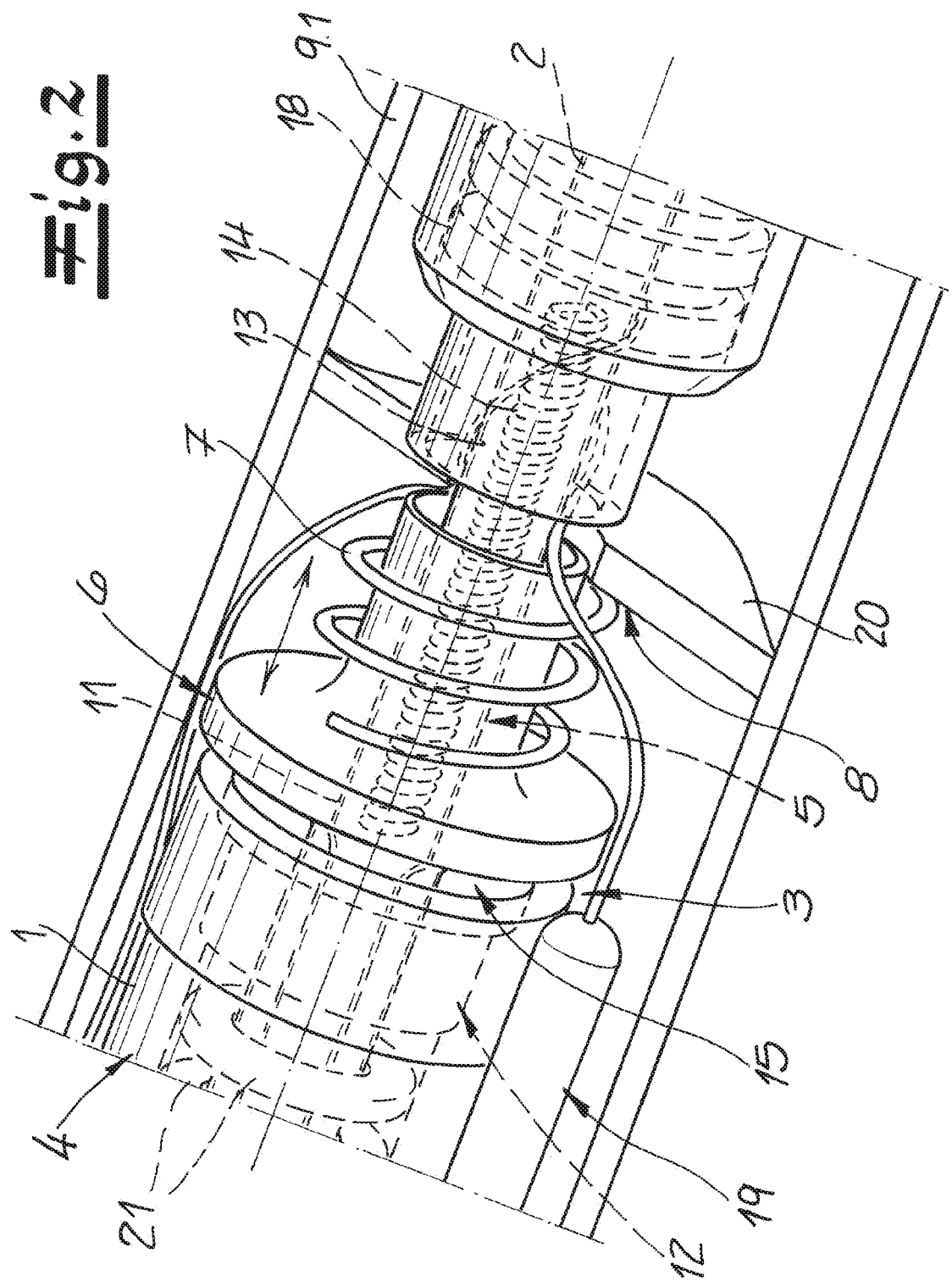
FIG. 2 shows an enlarged detail A from FIG. 1.

Advantageously, and in the depicted embodiment, the fluid line ends 5 that engage with the connection ends 3 of the connector 1, as well as the compensation elements 6 that are connected in each case in the area of the fluid line ends 5 together with the associated spring elements 7 of the compensation elements, are accommodated in the connector housing 9. Preferably, and in the depicted embodiment, in each case a support stop 8 for a compensation element 6 is likewise situated in the connector housing 9, and advisably, and in the depicted embodiment, the support stops 8 are an integral part of the connector housing 9. Preferably, and in the depicted embodiment, the support stops 8 are designed as housing walls 10 of the connector housing 9 that are perpendicular to the longitudinal direction of the associated fluid line 2 or of the associated fluid line end 5. Advantageously, and in the depicted embodiment, the housing walls 10 are one-piece integral parts of the connector housing 9. Preferably, and in the depicted embodiment, the connector housing 9 is made up of two half-shells, of which only one half-shell 9.1 is illustrated in FIGS. 1 and 2. Preferably, and in the depicted embodiment, each half-shell 9.1 has housing wall parts 20 which complete the housing walls 10 that form the support stops 8 when the half-shells 9.1 are combined.

It is apparent in the figures that a compensation element 6 protrudes from the outer surface 11 of the associated fluid line end 5 or of the associated fluid line 2, and in particular it is preferred, and in the depicted embodiment, that the compensation element protrudes perpendicularly with respect to the longitudinal direction of the associated fluid line end 5 or of the associated fluid line 2. As stated above, the compensation element 6 is preferably designed as a compensation flange that encloses the fluid line 2 or the fluid line end 5. The spring element 7 is situated in each case between the compensation element 6 or the compensation flange and the support stop 8. Advantageously, and in the depicted embodiment, the compensation element 6 is placed outside the connector 1 and inside the connector housing 9.

In the event of a volume increase or pressure increase in the connector section 4 of the connector 1, the fluid line end 5 in question is pressed out, in a manner of speaking, from the connector 1, and the compensation element 6 connected thereto is moved or pressed against the restoring force of the spring element 7 in the direction of the support stop 8. This is illustrated in a very schematic manner in FIG. 3. It is also apparent here that, preferably and in the depicted embodiment, O-rings 21 provide a seal between the movable fluid line ends 5 and the connection ends 3 of the connector 1.

According to one recommended embodiment and in the depicted embodiment, the fluid lines 2 are designed as heatable fluid lines 2. For this purpose, at least one heating component, in particular a heating wire (not illustrated in the figures), is preferably wound around the particular fluid line 2. Preferably, and in the depicted embodiment, the connector 1 is also designed as a heatable connector 1. For this purpose, a heating element 14 which protrudes from a fluid line 2 and into a fluid channel 12 of the connector 1 is advantageously provided in each case. Advantageously, and in the depicted embodiment, this heating element 14 is also situated in the interior 13 of the fluid line 2. Preferably, and in the depicted embodiment, the heating element 14 is designed as a coil spring. This heating element 14 or the coil spring is heated, in a manner of speaking, due to the heating of the fluid line 2, and the heat is conducted into the fluid channel 12 of the connector 1 via the heating element 14 or via the coil spring, so that here as well, the fluid channel 12 or the interior of the connector 1 is heated. Also discernible in the depicted embodiment are crimp connections 19 via which heating components for heating the fluid lines 2 are connected to one another. It is apparent in particular in FIG. 2 that according to one preferred embodiment and in the depicted embodiment, a compensation element 6 or a compensation flange encloses the heating element 14 that is provided in each case for heating the connector 1.

The invention claimed is:

1. A connection unit having a connector and at least one fluid line that is connected to the connector for conducting an aqueous urea solution, wherein the connector has at least two connection ends and a connector section that connects the connection ends to one another,
   wherein at least one fluid line end of a fluid line engages with a connection end of the connector, wherein in an area of the fluid line end of the fluid line at least one compensation element is connected to the fluid line or to the fluid line end, the compensation element being supportable on at least one support stop via at least one spring element,
   wherein due to a pressure increase in the connector section, the compensation element is movable against a restoring force of the spring element in a direction of the support stop, with an increase in the internal volume of the connector section,
   wherein a connector housing is provided that accommodates the connector, and wherein the at least one fluid line end that engages with a connection end of the connector and the compensation element that is connected in the area of a fluid line end, together with the spring element associated with the compensation element, are accommodated in the connector housing, and
   wherein the compensation element is situated outside the connector and inside the connector housing.

2. The connection unit according to claim 1, wherein the connector has three connection ends, wherein the connector section connects the three connection ends to one another.

3. The connection unit according to claim 2, wherein two of the three connection ends in each case enclose an angle of approximately 120°.

4. The connection unit according to claim 1, wherein the at least one fluid line end of the fluid line engages with each connection end, of the connector, and wherein the at least one compensation element is connected to the fluid line or to the fluid line end in the area of each fluid line end, and wherein each compensation element is supportable or on at least one support stop via at least one spring element in each case.

5. The connection unit according to claim 1, wherein the at least one support stop for at least one compensation element is situated in the connector housing and is an integral part of the connector housing.

6. The connection unit according to claim 1, wherein the at least one support stop is designed as a housing wall of the connector housing, and is situated transversely with respect to the longitudinal direction of the associated fluid line or of the associated fluid line end.

7. The connection unit according to claim 1, wherein the compensation element is fixedly connected to the associated fluid line end or to the associated fluid line.

8. The connection unit according to claim 7, wherein the compensation element is connected to the associated fluid line end or to the associated fluid line in a form-fit or force-fit manner.

9. The connection unit according to claim 1, wherein the compensation element protrudes from the outer surface of the associated fluid line end or of the associated fluid line.

10. The connection unit according to claim 1, wherein the compensation element has a compensation flange that is situated transversely with respect to the longitudinal direction of the associated fluid line end or of the associated fluid line, the compensation flange being supported on the support stop via the at least one spring element.

11. The connection unit according to claim 1, wherein the fluid line is designed as a heatable fluid line.

12. The connection unit according to claim 1, wherein the connector is heated with at least one heating element that protrudes into one of a fluid channel of the connector and the interior of a fluid line end.

13. The connection unit according to claim 12, wherein the compensation element encloses a heating element that is provided for heating the connector.

14. The connection unit according to claim 1, wherein the compensation element is configured to move against a restoring force of the spring element due to a pressure increase by formation of ice pressure in the connection section.

15. The connection unit according to claim 1, wherein the connector is designed as a heatable connector.

\* \* \* \* \*